US010916958B2

(12) United States Patent
Robotham (10) Patent No.: US 10,916,958 B2
(45) Date of Patent: Feb. 9, 2021

(54) OPTIMIZED ADAPTIVE CHARGING METHOD FOR STROBE (71) Applicant: Carrier Corporation, Palm Beach Gardens, FL (US)

(72) Inventor: Martin Paul Robotham, Bradenton, FL (US)

(73) Assignee: CARRIER CORPORATION, Palm Beach Gardens, FL (US)

(*) Notice: Subject to any disclaimer, the term of this patent is extended or adjusted under 35 U.S.C. 154(b) by 115 days.

(21) Appl. No.: 16/222,142

(22) Filed: Dec. 17, 2018

(65) Prior Publication Data
US 2019/0199102 A1 Jun. 27, 2019

Related U.S. Application Data (60) Provisional application No. 62/608,930, filed on Dec. 21, 2017, provisional application No. 62/618,276, filed on Jan. 17, 2018.

(51) Int. Cl.
H02J 7/00 (2006.01)
G08B 5/38 (2006.01)
G08B 29/18 (2006.01)
H05B 41/34 (2006.01)
H02J 7/34 (2006.01)

(52) U.S. Cl.
CPC .............. *H02J 7/007* (2013.01); *G08B 5/38* (2013.01); *G08B 29/181* (2013.01); *H02J 7/0068* (2013.01); *H02J 7/0077* (2013.01); *H02J 7/008* (2013.01); *H02J 7/345* (2013.01); *H05B 41/34* (2013.01)

(58) Field of Classification Search
None
See application file for complete search history.

(56) References Cited

U.S. PATENT DOCUMENTS

| 4,354,750 | A |   | 10/1982 | Hasegawa et al. |
| 4,630,916 | A |   | 12/1986 | Ishiguro et al. |
| 5,034,662 | A |   | 7/1991 | Nishida et al. |
| 5,341,069 | A |   | 8/1994 | Kosich et al. |
| 6,087,811 | A | * | 7/2000 | Crawford ............... H05B 41/34 320/137 |

(Continued)

FOREIGN PATENT DOCUMENTS

| CA | 2957165 A1 | 8/2017 |
| CN | 202535603 | 11/2012 |

(Continued)

OTHER PUBLICATIONS

The Extended European Search Report for EP Application No. 18213377.7, dated Mar. 4, 2019.

*Primary Examiner* — Dedei K Hammond
(74) *Attorney, Agent, or Firm* — Carlson, Gaskey & Olds, P.C.

(57) ABSTRACT

A notification appliance is disclosed that includes a light engine for generating light flashes at a predetermined interval, an energy store for supplying energy to the light engine to generate the light flashes at the predetermined intervals and a charge controller for charging the energy store to a full charge level required to generate the light flashes. The charge controller controlling an input current to charge the energy store to reach the full charge level at the predetermined interval.

19 Claims, 4 Drawing Sheets (56) References Cited

U.S. PATENT DOCUMENTS

| | | |
|---|---|---|
| 6,160,356 A | 12/2000 | Shimada |
| 6,819,059 B2 | 11/2004 | Block et al. |
| 6,822,400 B1 | 11/2004 | Ha et al. |
| 6,856,241 B1 | 2/2005 | Tice et al. |
| 7,242,314 B2 | 7/2007 | Fisler |
| 7,580,234 B2 | 8/2009 | Tamosaitis |
| 7,589,504 B2 | 9/2009 | Kobayashi et al. |
| 8,044,610 B2 | 10/2011 | Sandner et al. |
| 8,217,580 B2 | 7/2012 | Grimm et al. |
| 8,796,931 B2 | 8/2014 | Savage, Jr. |
| 9,058,730 B2 | 6/2015 | Mullins et al. |
| 9,087,441 B2 | 7/2015 | Gadonniex et al. |
| 9,225,249 B2 | 12/2015 | Barson |
| 10,447,054 B2 | 10/2019 | Christensen et al. |
| 2007/0035255 A1 | 2/2007 | Shuster et al. |
| 2008/0074535 A1 | 3/2008 | Ohsuga et al. |
| 2016/0197502 A1 | 7/2016 | Waters et al. |

FOREIGN PATENT DOCUMENTS

| | | |
|---|---|---|
| EP | 2345309 | 7/2011 |
| JP | 2015138062 | 7/2015 |
| KR | 200194629 U | 9/2000 |
| KR | 20010094629 | 11/2001 |

* cited by examiner

OPTIMIZED ADAPTIVE CHARGING METHOD FOR STROBE

CROSS-REFERENCE TO RELATED APPLICATION

This application claims benefit to U.S. Provisional Patent Application No. 62/608,930 filed on Dec. 21, 2017. This application also claims benefit to U.S. Provisional Patent Application No. 62/618,276 filed on Jan. 17, 2018.

BACKGROUND

Fire alarm and mass notification systems are used to notify the public of the presence of fire, smoke and other potentially harmful conditions. A notification appliance circuit (NAC) may be part of such a system and include many notification devices powered and controlled by a common power source and control panel.

A strobe notification appliance may be utilized as part of a NAC and is a warning device with a light engine, an energy store and a flash control. Strobes that are part of a NAC are required to flash in a synchronized manner. The strobe notification appliance provides a brief intense flash of light at predetermined intervals. The brief intense flash requires more power than is practically provided over the circuit to many different strobes. Accordingly, an energy store in each strobe notification appliance buffers energy used for each flash.

A significant amount of variability can exist in components of each notification appliance due to manufacturing tolerances and thermal effects. The variability in the components can cause variability in light level and current drawn from the NAC. The variability within each strobe appliance creates challenges in delivering the minimum rated light output at a low current draw from the NAC.

SUMMARY

A notification appliance according to one exemplary embodiment includes, among other possible things a light engine for generating light flashes at a predetermined interval. An energy store supplies energy to the light engine to generate the light flashes at the predetermined interval. A charge controller charges the energy store to a full charge level required to generate the light flashes. The charge controller controls an input current to charge the energy store to reach the full charge level at the predetermined interval.

In a further embodiment of the foregoing notification appliance, the charge controller includes a feed forward model that determines a predicted input current required to recharge the energy store at the predetermined interval.

In a further embodiment of any of the foregoing notification appliances, the predicted input current is based on performance of components in the notification appliance operating within nominal values.

In a further embodiment of any of the foregoing notification appliances, the current controller includes an adaptive feedback loop that generates a correction value for adjusting the predicted input current based on deviations from the nominal values of the components of the notification appliance.

In a further embodiment of any of the foregoing notification appliances, the adaptive feedback loop generates the correction value based on environmental conditions surrounding the notification appliance.

In a further embodiment of any of the foregoing notification appliances, the charge controller includes an inverse model to set the input current to a constant value such that a ratio of a peak current to an average current is between about 0.9 and 1.1.

In a further embodiment of any of any of the foregoing notification appliances, the charge controller includes an inverse model to set the input current to a constant value such that a ratio of a peak current to an average current is between about 1:1.

In a further embodiment of any of the forgoing notification appliances, the energy storage device is discharged to a low charge level after generation of a light flash and charged from the low charge level to the full charge level at an increasing rate for the substantially the entire predetermined interval.

In a further embodiment of any of the foregoing notification appliances, includes a sample and hold that captures the charge state of the energy store at a beginning and end of a discharge cycle.

In a further embodiment of any of the foregoing notification appliances, the charge controller supplies a charging current according to a charge level profile determined to charge the energy store from a low charge point after the discharge cycle to the full charge level at the end of the predetermined interval.

In a further embodiment of any of the forgoing notification appliances, the predetermined interval is between 0.9 and 1.1 seconds.

An energy discharge device according to another exemplary embodiment includes, among other possible things, a discharge component generating a high energy event at a predetermined interval. An energy store device supplies energy to the discharge component to generate the high energy event at the predetermined interval. A charge controller charges the energy storage device to a full charge level required to generate the high energy event. The current controller controls the input current to charge the energy store to reach the full charge level at the predetermined interval.

In a further embodiment of the foregoing energy discharge device, the charge controller includes a feed forward model that determines a predicted input current required to recharge the energy store at the predetermined interval.

In a further embodiment of any of the foregoing energy discharge devices, the predicted input current is based on performance of components in the energy discharge device operating within nominal values.

In a further embodiment of any of the foregoing energy discharge devices, the charge controller includes an adaptive feedback loop that generates a correction value for adjusting the predicted input current based on deviations from the nominal values of the components of the energy discharge device.

In a further embodiment of any of the foregoing energy discharge devices, the charge controller includes an inverse model to set the input current to a constant value such that a ratio of a peak current to an average current is between about 0.9 and 1.1.

In a further embodiment of any of the foregoing energy discharge devices, the energy storage device is discharged to a low charge level after supply to the discharge component and charged from the low charge level to the full charge level at an increasing rate for the predetermined interval.

A method of charging an energy store of a notification appliance according to another exemplary embodiment includes among other possible things, determining a predicted input current required to recharge an energy store at a predetermined interval with a feed forward model of a current controller based on nominal operating values of components of the notification appliance. A correction value is generated with an adaptive feedback loop of the current controller for adjusting the predicted input current based on deviations from the nominal values of the components of the notification appliance. The energy storage device is charged to reach a full charge level at the predetermined interval.

In a further embodiment of any of the foregoing methods, includes setting an input current based on the corrected predicted input current to a constant value with a ratio of a peak current to an average current between about 0.9 and 1.1.

In a further embodiment of any of the foregoing methods, includes charging the energy storage device from a low charge level after a discharge includes charging at an increasing rate for substantially all of the predetermined interval.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
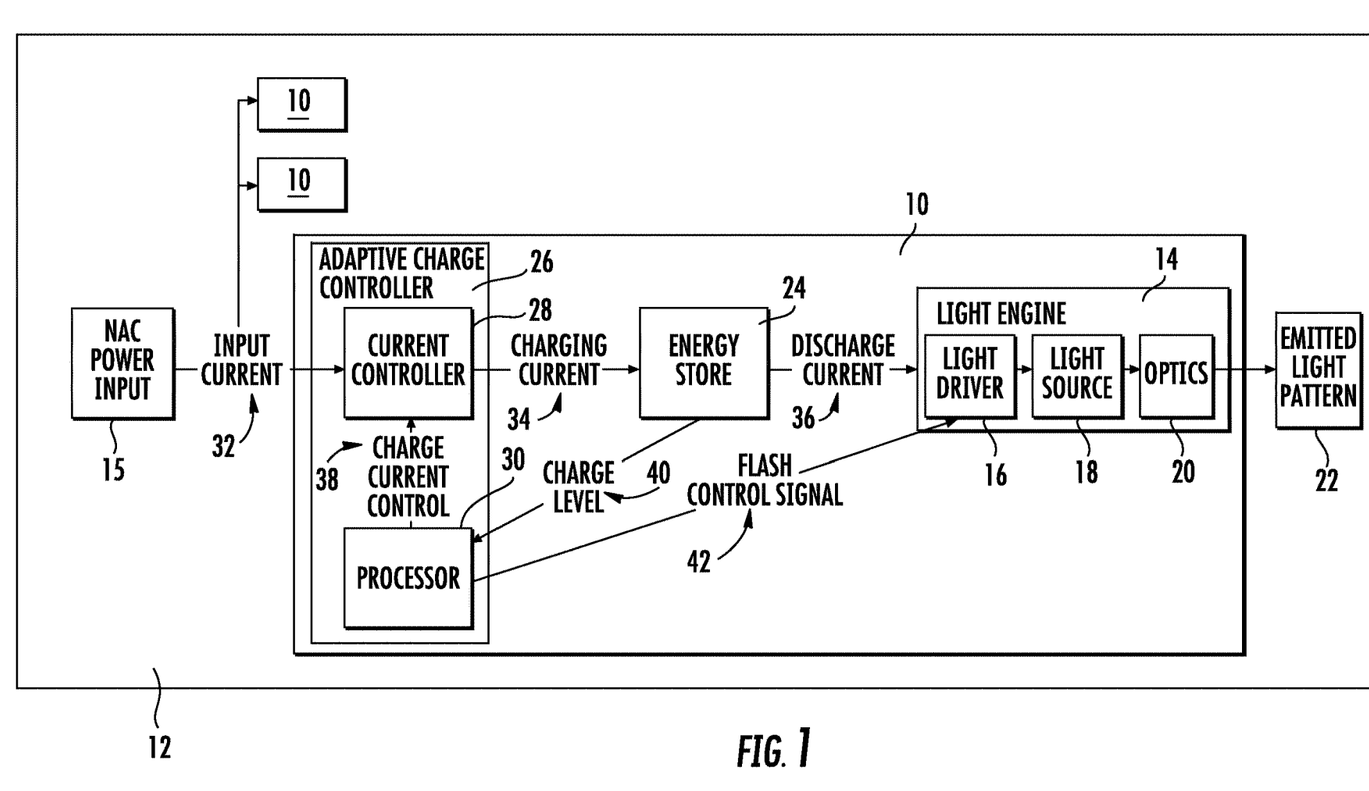
FIG. 1 is a block diagram of an example notification appliance.

Referring to FIG. 1, an example notification appliance 10 includes a light engine 14 that generates a brief, intense flash of light at a predetermined interval. The example notification appliance 10 is one of many notification appliances 10 that are part of a notification appliance circuit (NAC) schematically shown at 12. Each of the notification appliances 10 that are part of the NAC 12 are required to flash at the same time. However, it is not practical for all of the appliances 10 to take the amount of power required for a flash from the NAC power input 15 during the short time duration of each flash. Accordingly, each notification appliance 10 includes an energy store 24 that buffers energy from the NAC power input 15 for the light engine 14. Energy store 24 may include a super-capacitor, a capacitor or a battery, or other form of energy storage.

A charge controller 26 includes a current controller 28 and a processor 30. Processor 30 controls flash timing for the flash, the timing corresponding to the interval 54 shown in FIG. 3 described below, by using flash control 74 that generates a flash control signal 42 to control the light driver 16.

The charging current 34 is adjusted by the processor 30 that is part of the charge controller 26. In order to control charge of the energy store 24, processor 30 provides current control at charge current control 38. The processor 30 includes an algorithm that controls the charging current 34 which charges the energy store 24. The energy store 24 is used to convert a long duration low power charge from input current 32 provided by the NAC power input 15 into the high power short duration energy discharge utilized by the light engine 14. The energy store 24 is charged with a charging current 34 to generate the discharge current 36 to the light engine 14. The charging current 34 must charge the energy store 24 up to a fully charged level within a predetermined interval at which the light engine 14 operates. The energy store 24 is charged from a low charge level to a fully charged level required to power the light engine 14 and then recharged within the predefined interval of flashes for the next flash.

During the discharge period of the predefined interval, the light engine 14 takes power from the energy store 24 and uses a light driver 16 to convert that power into a form usable by a light source 18. The light source 18 generates light conditioned through optics 20 to emit a desired light pattern 22.

Each of the notification appliances 10 have significant variability due to component variations due to manufacturing tolerances and also each may behave differently due to the effect of ambient temperature local to each separate notification appliance 10 expressed through thermal coefficients. For example, included within the notification appliances 10 there are light engine 14 components as well as electrical components and hardware that define connections and provide electrical connections and communication throughout each of the appliances 10. All of these components may vary between each notification appliance 10. The variability may affect the energy storage, charge, and discharge such that some notification appliances 10 may consume more discharge current 36 to produce a sufficient minimum light pattern 22, and others may take less.

Despite the variability between various notification appliances 10 within the NAC 12, each of the light engines 14 are required to flash at the same synchronized interval and produce a minimum light pattern 22. Accordingly, the disclosed charge controller 26 accommodates variability within components and environmental conditions for each appliance 10 and provides sufficient charging current to the energy store 24 within the predefined interval as discussed below.

The example charge controller 26 includes a processor 30 which includes a control algorithm that adjusts the charging current 34 such that the charge level 40 of the energy store 24 is recharged to a full charge level required to generate the light flashes at a minimum output level and at an exact time that corresponds with the predetermined interval.

Figure 2:
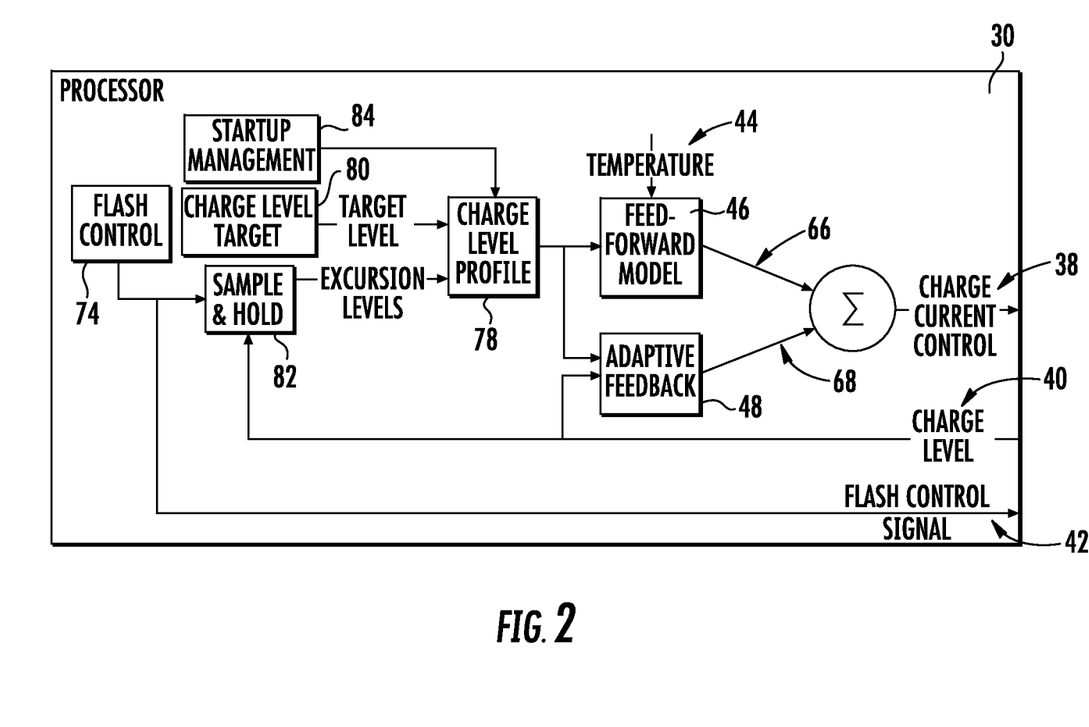
FIG. 2 is a block diagram of a portion of a controller of the notification appliance.
Figure 3:
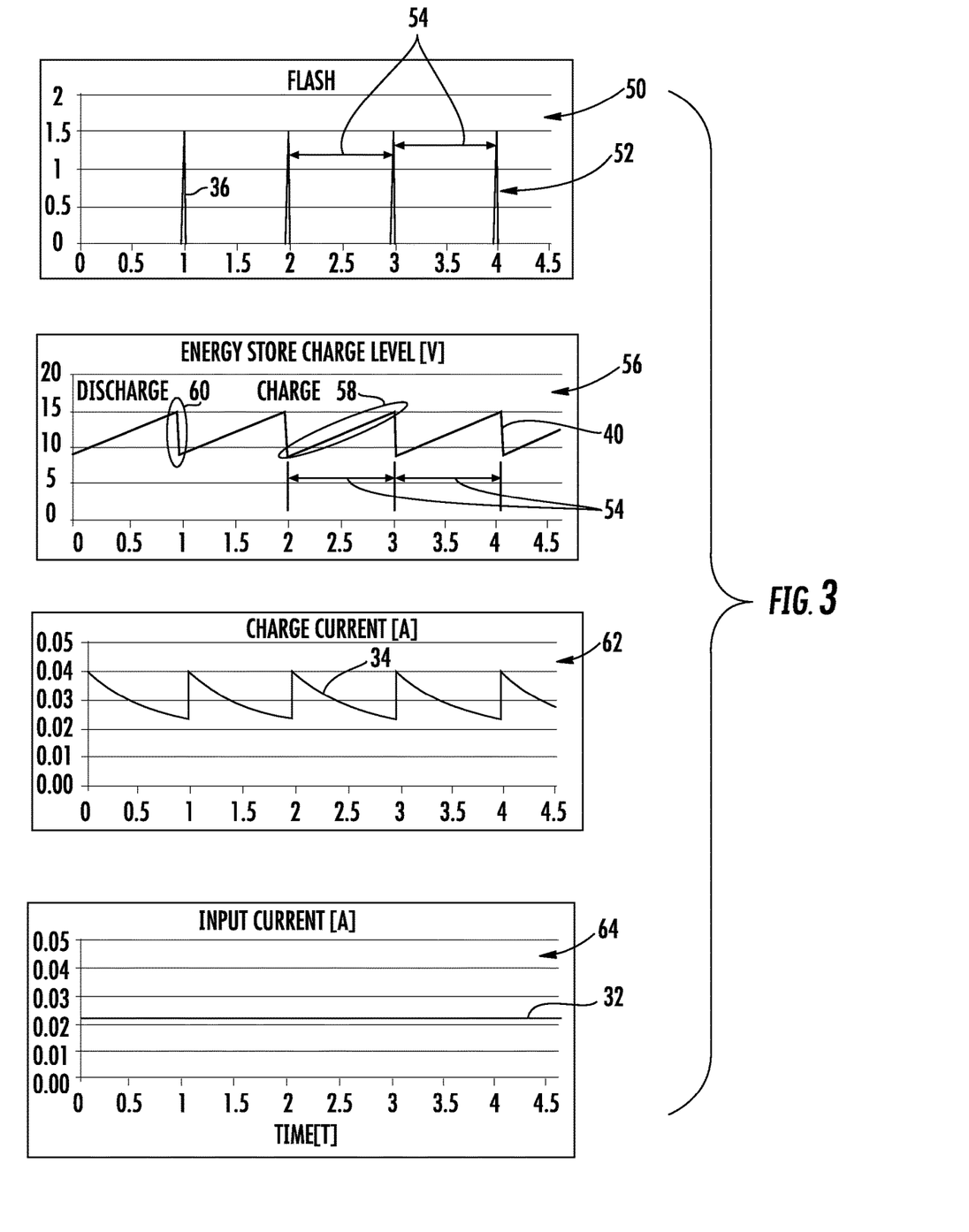
FIG. 3 is a graph illustrating wave forms associated with components of the example notification appliance.

Referring to FIGS. 2 and 3 with continued reference to FIG. 1, the charge level 40 is expressed in processor 30 as a signal which is input into feed forward model 46 and adaptive feedback 48 described below. The light engine 14 generates the flash shown as the energy discharge 52 indicated on graph 50 at the predetermined intervals 54. Note that the intervals shown on graphs 50, 56, 62, and 64 represent time periods and not absolute values, and the length of each time period may differ from what is shown depending on required use parameters such as code requirements or other variables, thus time is indicated in periods "Time[T]". Each energy discharge 52 corresponds with the discharge 60 shown in the energy store charge level graph 56. A charge current 34 provided by the current controller 28 of the charge controller 26 provides energy to the energy store 24 as is schematically shown in graph 62. The input current 32 from the NAC 12 into the appliance 10 is illustrated by graph 64.

The input current 32 is constant with a peak current to average current ratio that is between about 0.9 and 1.1. In another example embodiment a ratio between the peak current and average current is 1:1. Thus, for any given flash, the most optimal point is when the root mean square (RMS) current is equal to the average of the input current 32. The RMS current may be greater than the average current if the instantaneous current level falls below the average current for some period of a predetermined interval; this situation is considered sub-optimal.

Note that at startup, the charge level of the device may be different due to thermal factors and the energy store 24 being at a lower energy state than would be typical in a running system, so startup manager 84 loads a charge level profile optimized to transition the energy store 24 from a lower energy state to a running state.

When the system is in a running state, the constant input current 32 is possible due to the charge current 34 being controlled to charge the energy store 24 to the required charge level using the entire interval 54 such that there is no plateau in the charge levels. Instead, each charge event proceeds from a low charge point to a fully charged point at a continually increasing rate to the fully charged point indicated at 58. In other words, the current controller 28 supplies charging current 34 to the energy store 24 such that the energy store 24 attains a rate of charge to achieve the full charge 58 at the end of the charging interval immediately prior to discharge events 52 and 60.

As the energy store 24 charges, the voltage increases, and to maintain constant power to the energy store 24, the charge current 34 is decreased. Therefore as shown in graphs 56 and 62, the charge current 34 decreases during the charge period to maintain constant power delivered to the energy store 24 and the charge level 40 increases for the entire duration of the interval 54 between discharges 52, and drops precipitously at discharge event 60. Accordingly, the energy store 24 is charged such that the charge level 40 reaches the full charge indicated at 58 within the same interval 54 and just before the energy is needed for each discharge event 52.

As described above, the charging current 34 is adjusted by the processor 30 that is part of the charge controller 26. Processor 30 includes algorithms such as a feed forward model 46 and an adaptive feedback 48.

The feed forward model 46 accepts as input a charge level profile 78 and environmental inputs (e.g. temperature 44) and generates a predicted input current 66 for the charging current 34 that assumes all components are operating within their nominal values. The charge level profile 78 is the optimal efficiency path to get from the energy store's present state (at the end of the discharge event 52) to the target charge level 80 (at the end of interval 54). The sample and hold 82 captures the charge state at the beginning and end of the previous discharge cycle as a reference for the charge level profile 78.

The nominal values for each of the components along with information indicative of the surrounding environment 44 are used to determine the predicted input current 66. Information indicative of the surrounding environment, may include, for example, temperature as is schematically indicated at 44, but may also include other information such as humidity or other environmental factors. Such environmental information, such as temperature information 44, is provided by sensors and gauges (not shown) communicative with processor 30. The predicted input current 66 is the current required to charge the energy store 24 to the fully charged point 58 from the discharged level 60 within the interval 54 with all components operating within nominal values.

Adaptive feedback loop 48 may correct variation from any cause, but typically corrects variation caused by environmental factors and tolerance. The adaptive feedback loop 48 accepts as inputs the charge level profile 78 and the actual charge level 40 and generates a correction value 68 that remedies variations in the charging rate of the energy store 24 caused by detected variations from nominal values for the components of the notification appliance 10 as described below. Note that the adaptive feedback loop 48 does not detect variations in component values directly, but rather detects departures between the ideal path "charge level profile" and the actual path "charge level".

Accordingly, the predicted input current 66 generated by the feed forward model 46 are combined with the correction value 68 generated by the adaptive feedback loop 48 to generate a charge current control 38 signal communicated to the current controller 28 to control the charging current 34 to the energy store 24. An effect of the charge current control 38 on the charging current 34 is that the rate that the charging current 34 is applied to the energy store 24 changes such that, despite variation caused by environmental factors and tolerance, the charge level 40 achieves an expected value during intervals 54 and just prior to discharge events 52.

Figure 4:
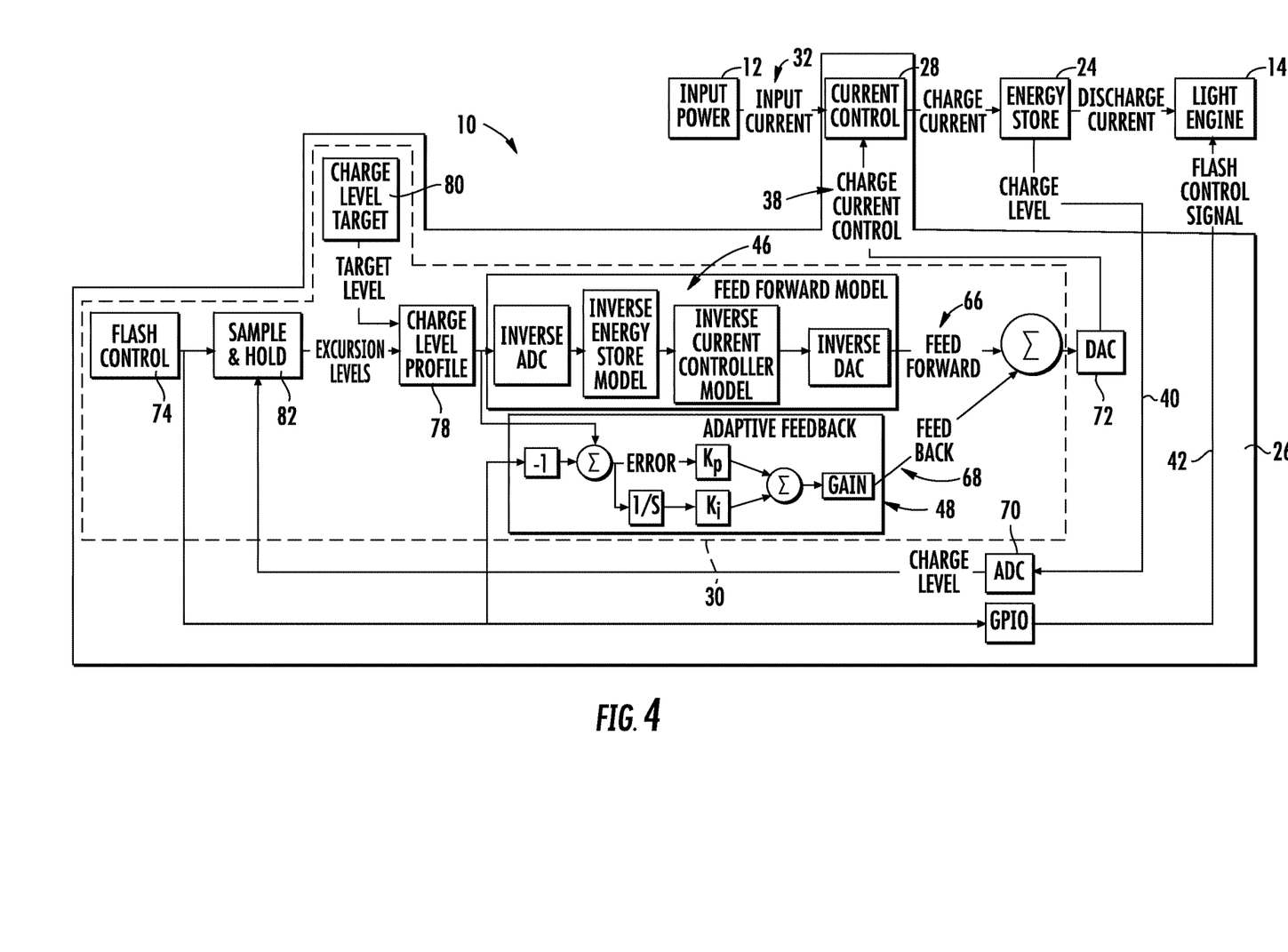
FIG. 4 is a block diagram of the example charge controller.

Referring to FIG. 4 with continued reference to FIGS. 1, 2 and 3, the example charge controller 26 is shown schematically with the feed forward model 46 and the adaptive feedback loop 48. The feed forward model 46 may be run as part of processor 30 or as part of a separate microprocessor connected to processor 30. The energy store charge level 40 as shown in graph 56 is sensed by an analog-to-digital converter ADC 70. The charge current control 38 is accomplished by a digital-to-analog converter DAC 72. The feedback loop 48 may be a proportional integral derivative PID controller or may be a proportional integral PI controller, or other employ another adaptive feedback methodology as is known in the art.

The example system adapts to component variations and environmental changes by adapting the charge level profile 78 to replenish the charge level to the full charge as is indicated at 58 immediately prior to the light discharge event 52. The rate of charge of the energy store 24 is independent of any specific starting time and is determined based on the lowest charge level at any given interval and the amount of charge required and rate required to recharge the energy store 24 to the full charge level within the interval 54. The rate required to recharge the energy store 24 at to the full charge level is determined by the processor 30 to take substantially the entire interval 54 such that the charge level 40 is increasing up until the point of full charge 58 just prior to discharge 60.

As discussed above, the charge controller 26 predicts the current level required to replenish the energy store 24 utilizing the feed forward model 46; the feed forward model 46 predicts the required current levels to replenish the energy store 24 based on nominal values for components of the notification appliance 10. Accordingly, rather than directly controlling the input current 32, the charge current 34 is controlled. Because the charge current 34 is easier to control it simplifies and lowers costs for implementing the disclosed charging method.

As discussed above, the adaptive feedback loop 48 corrects for variation in the components as well as environmental conditions to tailor the charge current 34 such that the charge current recharges the energy store 24 to the full charge level within the interval 54 between discharge events 52. Accordingly, the example adaptive charging method provides for the use of a constant input current enabling lower peak currents. This in turn enables for more notification appliances to be on a given circuit, and allows longer runs with lower cost wiring and lower quantity of power supplies. Moreover, the reduction in the use of energy throughout the NAC 12 allows for smaller capacity battery backups and enables other efficiencies and savings in materials.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A notification appliance comprising:
   a light engine for generating light flashes at a predetermined interval;
   an energy store for supplying energy to the light engine to generate the light flashes at the predetermined interval;
   a charge controller for charging the energy store to a full charge level required to generate the light flashes, the charge controller controlling an input current to charge the energy store to reach the full charge level at the predetermined interval; and
   a sample and hold that captures the charge state of the energy store at a beginning and end of a discharge cycle.

2. The notification appliance as recited in claim 1, wherein the charge controller includes a feed forward model that determines a predicted input current required to recharge the energy store at the predetermined interval.

3. The notification appliance as recited in claim 2, wherein the predicted input current is based on performance of components in the notification appliance operating within nominal values.

4. The notification appliance as recited in claim 3, wherein the charge controller includes an adaptive feedback loop that generates a correction value for adjusting the predicted input current based on deviations from the nominal values of the components of the notification appliance.

5. The notification appliance as recited in claim 4, wherein the adaptive feedback loop generates the correction value based on environmental conditions surrounding the notification appliance.

6. The notification appliance as recited in claim 4, wherein the charge controller is configured to set the input current to a constant value such that a ratio of a peak current to an average current is between about 0.9 and 1.1.

7. The notification appliance as recited in claim 4, wherein the charge controller is configured to set the input current to a constant value such that a ratio of a peak current to an average current is about 1:1.

8. The notification appliance as recited in claim 1, wherein the energy store is discharged to a low charge level after generation of a light flash and charged from the low charge level to the full charge level at an increasing rate for the entire predetermined interval.

9. The notification appliance as recited in claim 8, wherein the charge controller supplies a charging current according to a charge level profile determined to charge the energy store from a low charge level after the discharge cycle to the full charge level at the end of the predetermined interval.

10. The notification appliance as recited in claim 1, wherein the predetermined interval is between 0.9 and 1.1 seconds.

11. An energy discharge device comprising:
    a discharge component generating a high energy event at a predetermined interval;
    an energy storage device for supplying energy to the discharge component to generate the high energy event at the predetermined interval;
    a charge controller for charging the energy storage device to a full charge level required to generate the high energy event, the charge controller controlling an input current to charge the energy store to reach the full charge level at the predetermined interval; and
    a sample and hold that captures the charge state of the energy store at a beginning and end of a discharge cycle, wherein the charge controller supplies a charging current according to a charge level profile determined to charge the energy store from a low charge state after the discharge cycle to the full charge level at the end of the predetermined interval.

12. The energy discharge device as recited in claim 11, wherein the charge controller includes a feed forward model that determines a predicted input current required to recharge the energy store at the predetermined interval.

13. The energy discharge device as recited in claim 12, wherein the predicted input current is based on performance of components in the energy discharge device operating within nominal values.

14. The energy discharge device as recited in claim 13, wherein the charge controller includes an adaptive feedback loop that generates a correction value for adjusting the predicted input current based on deviations from the nominal values of the components of the energy discharge device.

15. The energy discharge device as recited in claim 12, wherein the charge controller is configured to set the input current to a constant value such that a ratio of a peak current to an average current is between about 0.9 and 1.1.

16. The energy discharge device as recited in claim 11, wherein the energy storage device is discharged to a low charge level after supply to the discharge component and charged from the low charge level to the full charge level at an increasing rate for the predetermined interval.

17. A method of charging an energy store of a notification appliance, the method comprising:
    determining a predicted input current required to recharge an energy store at a predetermined interval with a feed forward model of a charge controller based on nominal operating values of components of the notification appliance;
    capturing a charge state of the energy store with a sample and hold at a beginning and end of a discharge cycle, wherein the charge controller supplies a charging current according to a charge level profile determined to charge the energy store from a low charge state after a discharge cycle to a full charge level at an end of the predetermined interval;
    generating a correction value with an adaptive feedback loop of the charge controller for adjusting the predicted input current based on deviations from the nominal values of the components of the notification appliance; and
    charging the energy store to reach a full charge level at the predetermined interval.

18. The method as recited in claim 17, including setting an input current based on the corrected predicted input current to a constant value with a ratio of a peak current to an average current of about 0.9 and 1.1.

19. The method as recited in claim 17, wherein charging the energy store from a low charge level after a discharge includes charging at an increasing rate for all of the predetermined interval.

\* \* \* \* \*